US012103721B2

(12) United States Patent
Schwartz et al.

(10) Patent No.: US 12,103,721 B2
(45) Date of Patent: Oct. 1, 2024

(54) ROTARY FILLING MACHINE

(71) Applicant: Spee-Dee Packaging Machinery, Inc., Sturtevant, WI (US)

(72) Inventors: Joshua A. Schwartz, Mount Pleasant, WI (US); James R. Knudsen, Racine, WI (US); Ronald B. Brandt, Mount Pleasant, WI (US); James P. Navin, Burlington, WI (US); Anthony D. Stefanelli, Boyceville, WI (US); Darren Beahler, West Allis, WI (US); Andrew Boles, Kenosha, WI (US)

(73) Assignee: Spee-Dee Packaging Machinery, Inc., Sturtevant, WI (US)

( * ) Notice: Subject to any disclaimer, the term of this patent is extended or adjusted under 35 U.S.C. 154(b) by 0 days.

(21) Appl. No.: 18/108,976

(22) Filed: Feb. 13, 2023

(65) Prior Publication Data

US 2023/0192340 A1 Jun. 22, 2023

Related U.S. Application Data

(60) Division of application No. 17/306,115, filed on May 3, 2021, now abandoned, which is a continuation-in-part of application No. 16/577,776, filed on Sep. 20, 2019, now Pat. No. 10,994,879.

(51) Int. Cl.

| | |
|---|---|
| ***B65B 43/50*** | (2006.01) |
| ***B65B 1/06*** | (2006.01) |
| ***B65B 1/30*** | (2006.01) |
| ***B65B 39/00*** | (2006.01) |
| ***B67C 11/02*** | (2006.01) |
| *B65B 1/10* | (2006.01) |

(52) U.S. Cl.

CPC ................ *B65B 43/50* (2013.01); *B65B 1/06* (2013.01); *B65B 1/30* (2013.01); *B65B 39/007* (2013.01);

(Continued)

(58) Field of Classification Search

CPC .. B65B 43/50; B65B 1/06; B65B 1/30; B65B 39/007; B65B 2039/009; B65B 29/00;

(Continued)

(56) References Cited

U.S. PATENT DOCUMENTS 2,156,271 A * 5/1939 Beck ......................... B65B 1/22 222/302
2,655,301 A * 10/1953 Riemer ................... B65B 1/363 141/93

(Continued)

*Primary Examiner* — David Colon-Morales
*Assistant Examiner* — Stephanie A Shrieves
(74) *Attorney, Agent, or Firm* — Boyle Fredrickson S.C.

(57) ABSTRACT

A rotary filling machine for filling containers with bridgeable dry materials includes a turret supporting a plurality of circumferentially spaced drop buckets and a plurality of funnel assemblies located under the drop buckets. A stationary slide plate is located vertically between the funnel assemblies and the drop buckets. The slide plate is configured such that flow paths from the bottoms of the drop buckets to the inlet openings of the funnel assemblies increase progressively in at least a portion of a circumferential extent of the slide plate. Drop buckets are located above the slide plate and rotate with the turret. Each drop bucket is provided with one or more partitions that hinder the "snow-plowing of particles" along the edge of the associated fill opening in the machine's fill plate rather than the sweeping of those particles into the fill opening.

17 Claims, 12 Drawing Sheets

(52) U.S. Cl.
CPC ................. *B67C 11/02* (2013.01); *B65B 1/10* (2013.01); *B65B 2039/009* (2013.01)

(58) Field of Classification Search
CPC ......... B65B 39/145; B65B 43/60; B65B 1/36; B67C 11/02
USPC .......................................................... 141/144
See application file for complete search history.

(56) References Cited

U.S. PATENT DOCUMENTS

| | | | | | |
|---|---|---|---|---|---|
| 4,702,289 | A * | 10/1987 | Benner, Jr. | B65B 1/363 | 53/562 |
| 5,320,146 | A * | 6/1994 | Stevie | B65B 1/363 | 141/147 |
| 5,551,492 | A * | 9/1996 | Rack | B65B 1/363 | 141/147 |
| 5,687,551 | A * | 11/1997 | Mustain | B65B 43/60 | 141/10 |
| 5,762,116 | A * | 6/1998 | Moore | B65B 39/145 | 198/803.11 |
| 6,119,440 | A * | 9/2000 | Benner, Jr. | B65B 39/145 | 53/473 |
| 6,814,111 | B1 * | 11/2004 | Oliverio | B65B 43/267 | 141/222 |
| 8,991,442 | B1 * | 3/2015 | Navin | B65B 43/50 | 141/2 |
| 2004/0261357 | A1 * | 12/2004 | Takahashi | B65B 37/08 | 53/247 |
| 2017/0029142 | A1 * | 2/2017 | Evans | B65B 29/00 | |
| 2018/0215489 | A1 * | 8/2018 | Gallaun | B65B 39/10 | |

* cited by examiner

ROTARY FILLING MACHINE

CROSS REFERENCE TO A RELATED APPLICATION

The present application is a divisional of U.S. patent application Ser. No. 17/306,115, filed May 3, 2021, which is a continuation U.S. Pat. No. 16,577,776, filed Sep. 20, 201, both assigned to Applicant, the subject matter of each of which is hereby incorporated by reference in its entirety.

BACKGROUND OF THE INVENTION

1. Field of the Invention

The invention generally relates to the field of rotary machines for dispensing controlled volumes of dry materials into containers and, more particularly, relates to a rotary filling machine for dispensing bridgeable dry materials that are prone to clumping and/or sticking and to a method of operating such a machine.

2. Discussion of the Related Art

Rotary filling machines are routinely used for dispensing dry materials into containers from above. Such machines typically include a rotating turret located underneath a rotary combination scale or other device delivering materials to be dispensed. The turret supports a plurality of circumferentially-spaced drop buckets or bins having lower openings. The opening of each drop bucket or bin cooperates with an underlying funnel. In operation, each drop bucket receives a designated quantity of materials as it rotates under the delivering device and discharges the materials into the associated funnel. The materials then flow through the funnel and are dispensed into an underlying container that is spaced circumferentially from the delivery device.

Dispensing of some materials can be problematic due to their propensity to "bridge" or span gaps and material pathways in the fill equipment and clog the equipment. Some such materials are relatively tacky or have high adhesive properties, which cause the materials to clump or stick to one another and/or to stick to the drop bucket or funnel. Typical of such materials are "gummies," which are relative soft, chewable sweet foods. Gummies are typically, but not always, gelatin based. They are most often used in candy, but also are used in other materials such as chewable vitamins and medicines. They vary in size and shape, though most are "bite size", i.e., having a maximum diameter of less than 5 cm. Some take the appearance of fanciful or stylized animals such as bears or fish. Others are in the form of a generally elliptical tablet. They may or may not be sugar coated. The propensity of these materials to clump together and to stick to surfaces of the filling machine creates a tendency to bridge or clog flow path portions such as the bottom opening of a drop bucket or the throat of a funnel. Bridging is of particular concern when filling a container having a relatively small-diameter fill-opening with a material formed relatively large-diameter particles because the particles must be directed through relatively small fill openings, sometimes having a diameter of only 2-3 times that of the maximum particle diameter. Even if they do not bridge sufficiently to clog a flow path, the materials may nevertheless stick to the a surface such as the bottom of the drop bucket adjacent the bottom opening or to the side surface of the funnel sufficiently long to delay or prevent dispensing into an underlying container, or to at least fall into the container in clumps rather than one at a time. The resultant delay/blockage can cause reduced fill accuracy including partial fill and no-fill conditions.

Other materials are not as sticky as traditional gummies, but are still subject to entanglement with one another such that they bridge openings or spaces. Some nuts, such as cashews, exhibit this characteristic.

"Bridgeable materials," as used herein, thus means any discrete dry particles that have a relatively high propensity to clump by adhesion and/or entanglement with one another and/or to stick to other surfaces. Bridgeable materials include, for example, gummies, which are tacky or have high adhesive characteristics, and some nuts such as cashews, which are prone to entanglement.

The need therefore has arisen to provide a rotary filling machine that is capable of reliably dispensing bridgeable dry materials in a controlled, predictable manner.

The need additionally has arisen to provide a rotary filling machine that meters the dispensing of bridgeable materials in a manner that reduces or prevents clumping and/or bridging.

The need additionally has arisen to provide a rotary filling machine that "singulates" dispensed bridgeable materials so that they are dispensed into the container, more often than not, one at a time as opposed to in clumps or batches.

BRIEF DESCRIPTION

In accordance with a first aspect of the invention, a rotary filling machine includes a central rotatable hub an opening extending vertically therethrough, a plurality of circumferentially spaced drop buckets located over the opening, and a plurality of funnel assemblies mounted on the hub beneath the opening. Each drop bucket has an open top, an open bottom in alignment with the opening in the wear plate, and a perimeter wall. Each funnel assembly has an upper inlet positioned beneath the bottom opening of a corresponding drop bucket, and a lower dispensing outlet. A stationary slide plate is located vertically between the funnel assemblies and the drop buckets. The slide plate is configured such that flow paths from the bottoms of the drop buckets to the inlet openings of the funnel assemblies increase progressively in at least a portion of a circumferential extent of the slide plate.

The inner edge of the slide plate may have a tapered portion, which may be tapered continuously and uniformly throughout at least a majority of the tapered portion.

Each drop bucket may have first and second opposed (upstream and downstream) end walls and inner and outer walls, each of which abuts an associated end of both end walls. In this case, each drop bucket may have at least one partition that extends at least generally vertically between the inner and outer walls to define discrete compartments within the drop bucket.

Each funnel assembly may have an inner dilation chamber that is dimensioned and configured to progressively dilate materials falling therethrough. The dilation chamber of each funnel assembly is bordered by first and second opposed upper walls and first and second lower walls. The walls are located and configured such that materials impinging on the first upper wall are directed to the second lower wall and thence out of the dilation chamber.

In one configuration, the dilation chamber is positioned in the upper funnel, and the lower funnel presents a flow path that has a lower portion that is inclined at an acute angle relative to an upper portion thereof.

The rotary filling machine may further include funnel knockers that are positioned so as to resiliently impact against the funnel assemblies during rotation of the rotary filling machine.

In accordance with another aspect of the invention, a funnel assembly for dispensing materials into a container is provided. The funnel assembly includes upper and lower funnels. The upper funnel has an inner dilation chamber that is dimensioned and configured to progressively dilate the dry bridgeable materials falling therethrough. The dilation chamber of the upper funnel may be bordered by first and second opposed upper walls and first and second lower walls. In this case, the walls are located and configured such that materials impinging on the first upper wall are directed to the second lower wall and thence out of the dilation chamber.

A plurality of fingers may project into each funnel assembly between the inlet and the outlet proximal to an axial centerline of the funnel assembly.

These and other features and aspects of the present invention will be better appreciated and understood when considered in conjunction with the following description and the accompanying drawings. It should be understood, however, that the following description, while indicating preferred embodiments of the present invention, is given by way of illustration and not of limitation.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION

Figure 1:
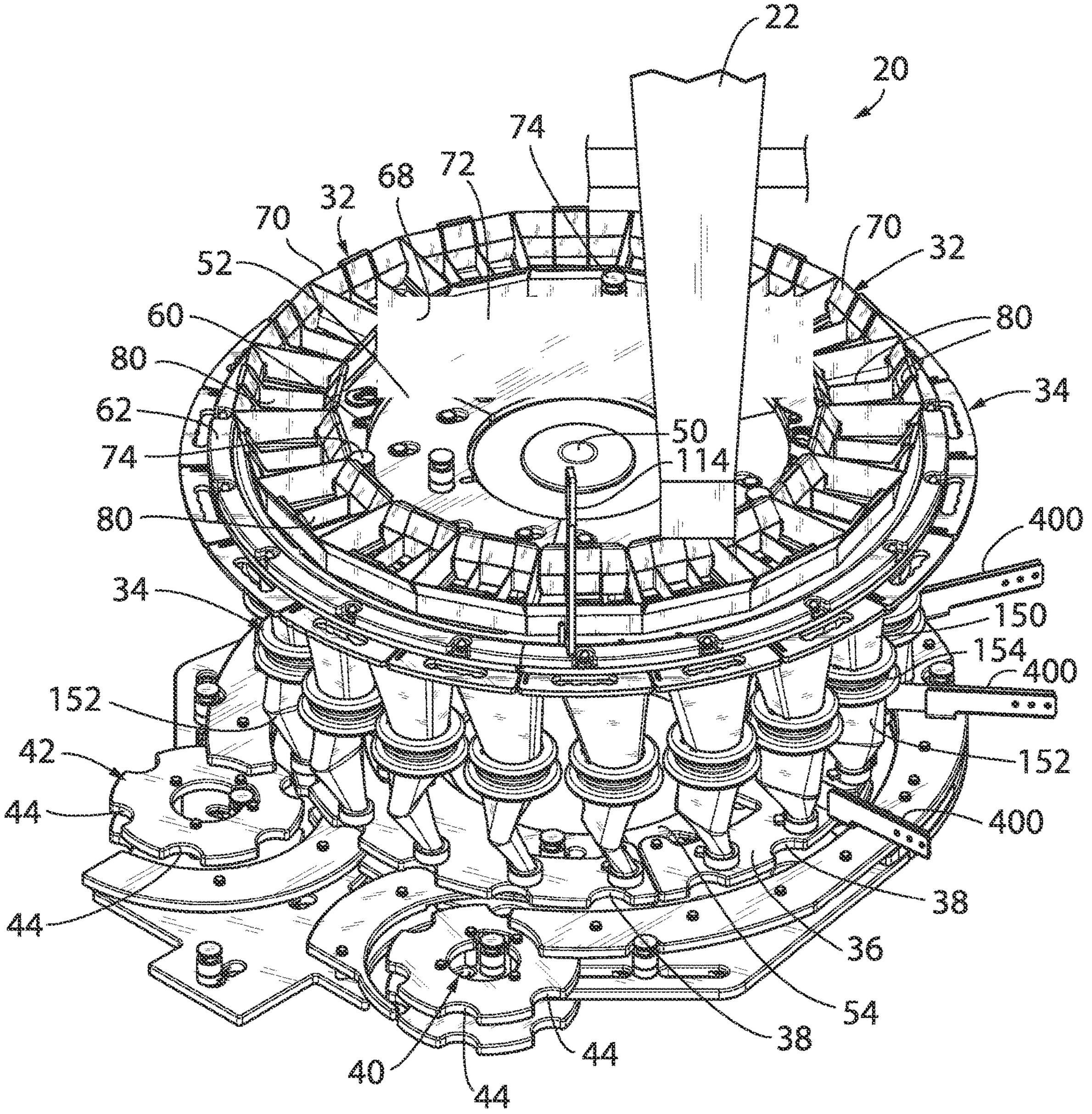
FIG. 1 is a perspective view of a rotary dispensing machine constructed in accordance with the present invention.
Figure 2:
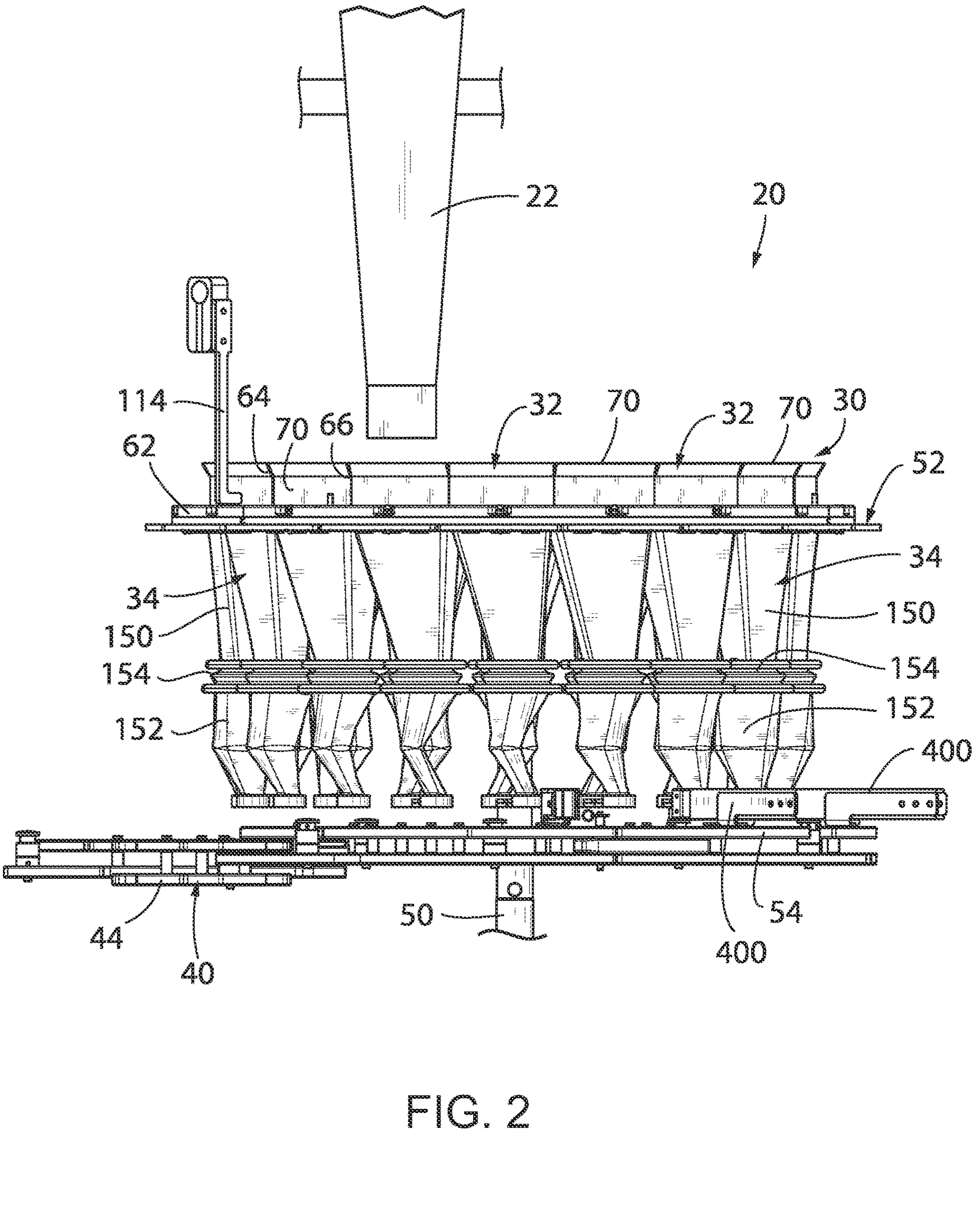
FIG. 2 is a side elevation view of the rotary dispensing machine of FIG. 1.
Figure 3:
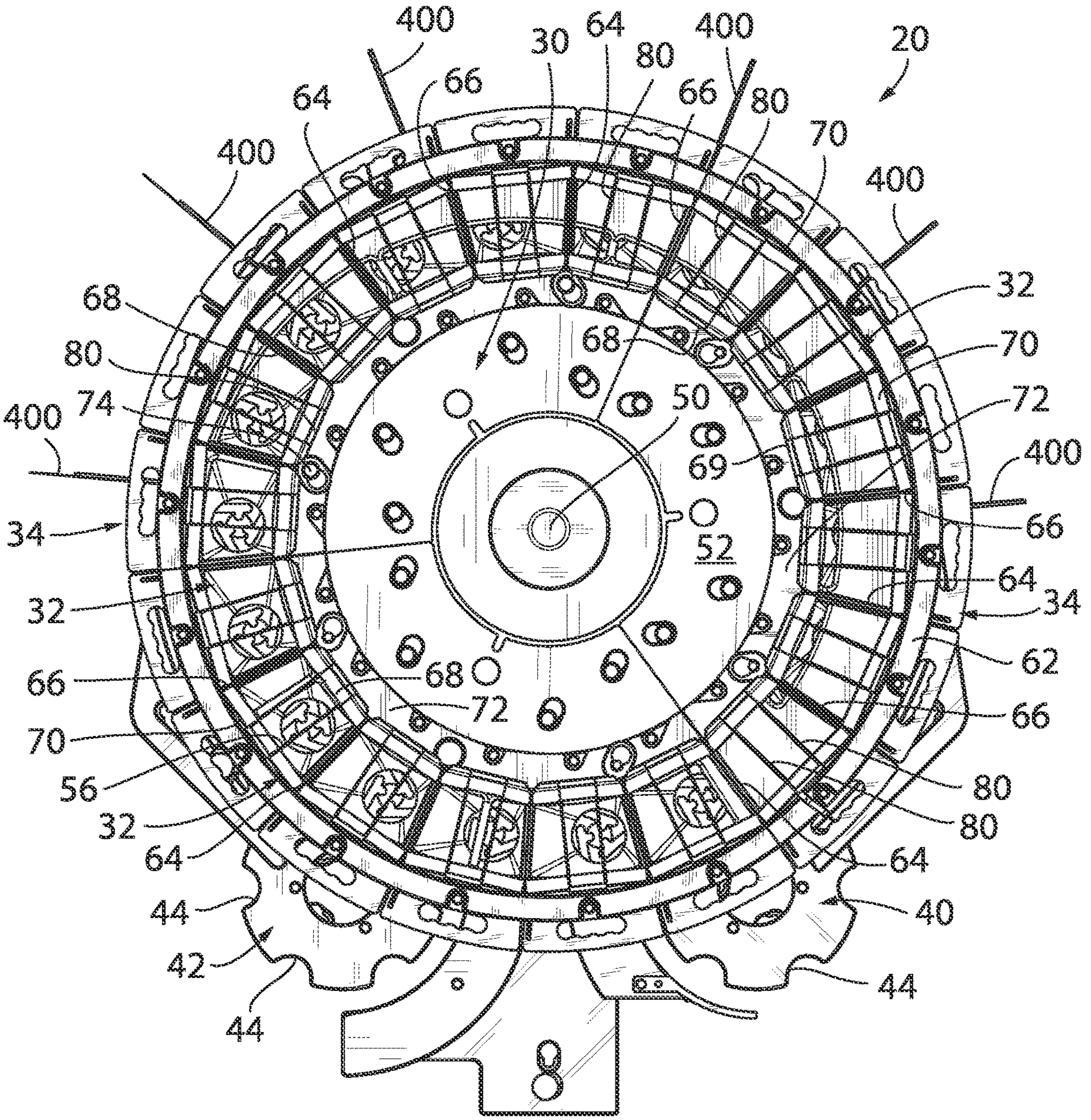
FIG. 3 is a top plan view of the rotary filling machine of FIGS. 1 and 2.

Turning initially to FIGS. 1-3, a rotary filling machine 20 that is constructed in accordance with the invention is illustrated. The machine 20 is configured to receive bridgeable dry materials (as that term is defined above) from a delivery system and to dispense the materials in a controlled manner into underlying containers. The "controlled" manner may be a designated number of particles per receptacle, a designated weight of particles per receptacle, or a designated volume of particles per receptacle. In the illustrated embodiment, the delivery system comprises a rotary combination scale 22 that receives materials from a conveyor (not shown) and that dispenses a given weight of materials per batch. If, as is typically the case, the average number of particles per a given weight is known, the rotary combination scale 22 thus dispenses a given number of particles per batch. Once such rotary combination scale is available through Yamoto, but can be supplied by any number of vendors. The illustrated rotary filling machine is optimized to fill bottles with gummies having a maximum dimension of about 2.25 cm and to dispense those gummies into a bottle having a fill opening diameter of 4.25 to 4.50 cm. The machine configuration, and most notably the configuration of the funnel assemblies described below, could vary considerably depending upon the size and characteristics of the particles being handled and the fill opening diameter of the container being filled.

Still referring to FIGS. 1-3, the rotary filling machine 20 includes a rotating turret supporting a plurality (18) of circumferentially spaced drop buckets 32 and an equal number of funnel assemblies 34, one of which is associated with each drop bucket 32. A like plurality of containers holders 36 (it being understood that "container" as used herein means any receptacle configured to receive materials from the funnel assemblies) are mounted on the bottom of the hub 30 beneath the funnel assemblies 34 for receiving containers to be filled. In addition, and significantly, a stationary slide plate 100 (first seen in FIG. 4) is mounted on the turret 30 vertically between the drop buckets 32 and the funnel assemblies 34 for dilating or singulating the flow of materials from the drop buckets 32 to the funnel assemblies 34.

The containers 37 (FIGS. 9 and 10) of this particular embodiment are bottles, and the container holders 36 can be thought of as bottle holders. Each bottle holder 36 has a notch 38 configured for a specific bottle shape and size to receive a bottle 37, thus holding a bottle in place beneath the associated funnel assembly 34 during the filling operation. Bottles are delivered to and received from the container holders 36 by way of a conveyor (not shown) that delivers empty bottles to an upstream transferring device 40 and receives empty bottles from a down-stream-most bottle holder 36 via a downstream transferring device 42. Each transferring device 40, 42 has a plurality of circumferentially spaced peripheral notches 44, each of which rotates into and out of cooperative engagement with the notch 38 of the associated bottle holder 36 to transfer bottles between the bottle holders 36 and the conveyor. The conveyor and transfer devices 40 and 42 are configured to operate in synchronism with the turret 30. Different supply and handling systems could be utilized for containers other than bottles.

Referring to FIGS. 1-5, the turret 30 includes a central shaft 50 and upper and lower disk arrangements 52 and 54. The shaft 50 is driven by an electric motor (not shown). The upper disk arrangement or "fill plate" 52 is fixed to the shaft 50 and has a segmented circular opening near its outer perimeter, each segment of which forms a fill opening 56 that is in alignment with a drop bucket 32 from above and with a funnel assembly 34 from below. Each fill opening 56 of this exemplary embodiment is about 15 cm long by about 10 cm wide. The drop buckets 32 are mounted on the fill plate 52 inboard of the fill openings 56. Mounts also are formed on or in the fill plate 52 for receiving funnel assemblies 34. These mounts may take the form of openings configured to cooperate with a magnetic quick-mount arrangement of the type described in commonly assigned U.S. Pat. No. 8,991,442, the subject matter of which is incorporated herein by reference in its entirely. Alternatively, each mount may comprise spaced holes for receiving spaced bolts that mount the funnel assemblies 34 on the bottom of the fill plate 52.

In the illustrated embodiment, the fill plate 52 is formed from stainless steel or a comparable durable, easily cleanable material. An annular rotating wear plate, formed by inner and outer annular rings 60 and 62, is mounted on top of the stainless-steel fill plate 52, with the annular rings 60 and 62 being located radially inboard and outboard of the fill openings 56, respectively. The rings 60 and 62 are formed of a material that is relatively hard and wear resistance but that has a relatively low coefficient of sliding friction. HDPE, Delrin® (an acetal homopolymer), and UHMW are examples of suitable materials but other materials may be utilized with similar characteristics based on availability and product interaction. An annular opening is formed between the inner and outer rings 60 and 62 over the fill openings 56. The drop buckets 32 are supported on the upper surface of the wear plate rings 60 and 62 and are attached to the hub 30 as discussed below.

Still referring to FIGS. 1-4, each drop bucket 32 is formed of a material that is durable and is easy to clean and that has a relatively low coefficient of sliding friction. Any of a variety of grades of stainless steel and materials with similar characteristics based on product interaction and environment would suffice. This material may be dimpled or otherwise modified in order to inhibit adhesion of tacky particles thereto. In this embodiment, each drop bucket 32 is generally trapezoidal in shape, having first and second or upstream and down opposed end walls 64 and 66 of the counterclockwise-rotating and inner and outer radial walls 68 and 70, each of which abuts an associated end of both end walls 64 and 66. The outer wall 70 of each drop bucket 32 is longer than the inner wall 68, and the end walls 64 and 66 are inclined relative to a radial bisector of the turret assembly, providing a trapezoidal shape that permits the drop buckets 32 to cover the entire circular area containing the drop buckets 32 without intervening gaps. The upper ends of the inner and outer end walls 64 and 66 are flared outwardly to serve as chutes that direct materials that may otherwise miss the drop bucket 32 into the interior of the drop bucket 32. A number, such as six, drop buckets could be provided in a semi-circular subassembly. A semi-circular flange 72 extends rearwardly from the drop buckets 32. As best seen in FIG. 5, each subassembly is held in place by a plurality of spring-loaded plungers 74 that extend through openings 76 in the flange 72 and that selectively engage corresponding recesses 78 in the inner wear plate ring 60 to lock the subassembly in place.

Figure 4:
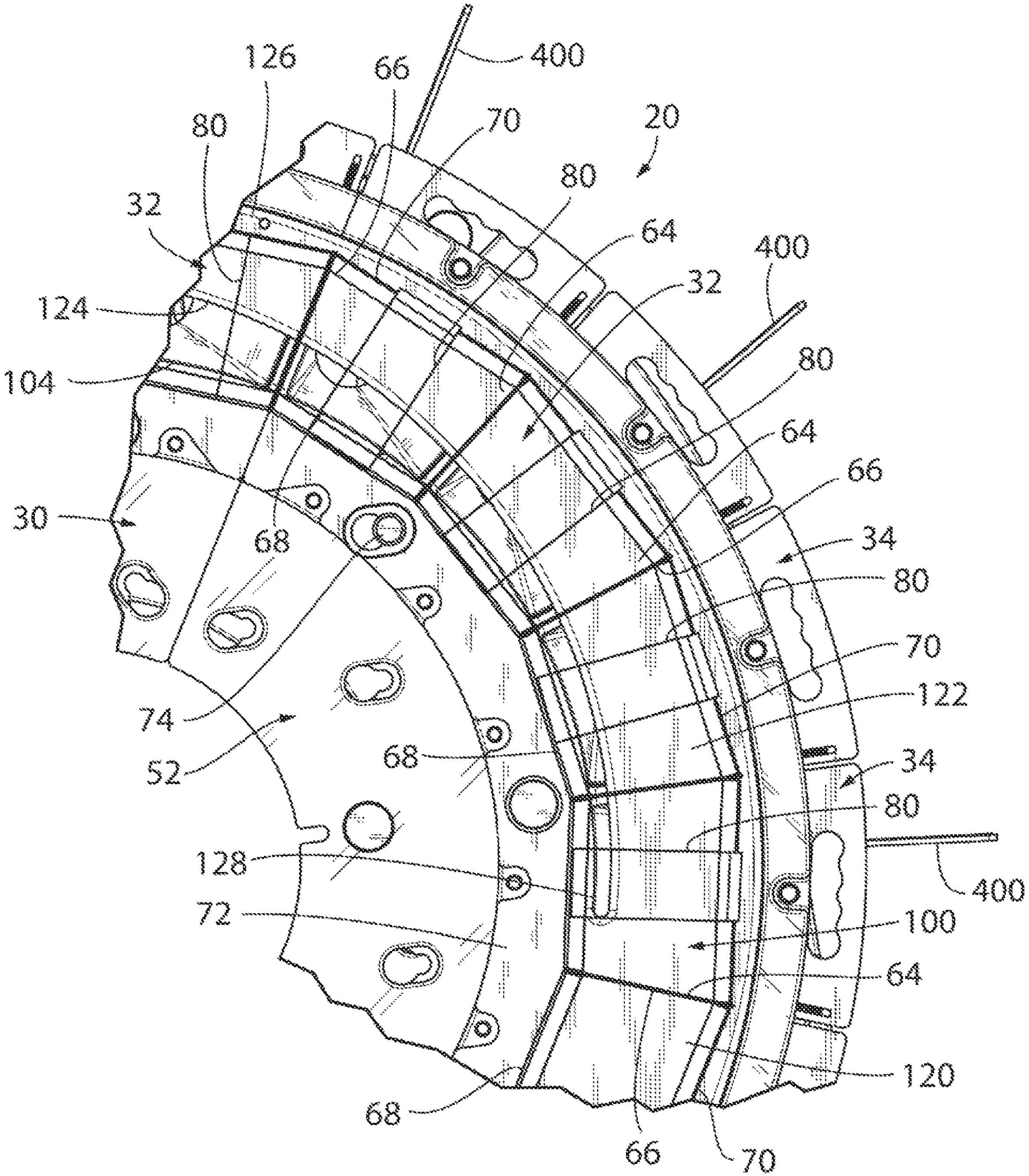
FIG. 4 is fragmentary top plan view of a portion of the rotary filling machine of FIGS. 1-3.
Figure 5:
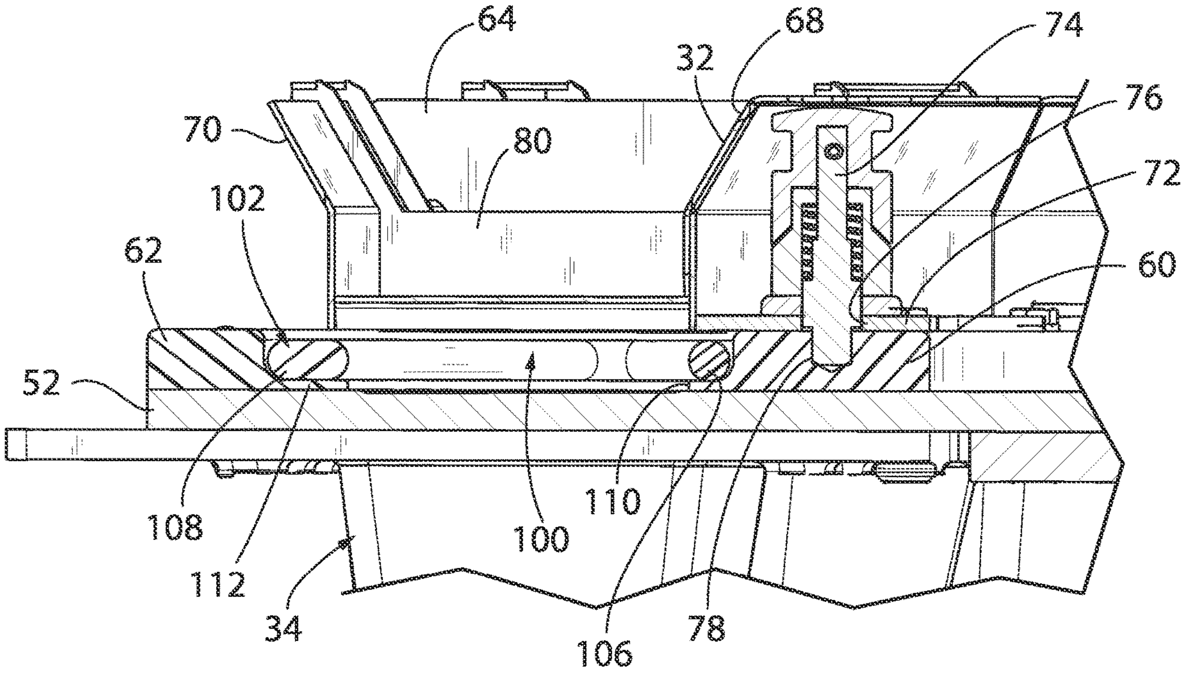
FIG. 5 is a sectional fragmentary radial elevation view of an upper portion of the rotary filling machine of FIGS. 1-3.

Still referring to FIGS. 1-4 and most particularly to FIG. 4, in order to prevent materials received from the rotary combination scale 22 from simply being pushed in front of the upstream end wall 64 of each drop bucket 32, which is of particular concern for relatively small fills, each drop bucket 32 may have at least one partition that extends at least generally vertically between the inner and outer walls 68 and 70 from the bottom of the drop bucket 32. Two equally-spaced partitions 80 are provided in the illustrated embodiment, each of which extends at least generally parallel with one another and with the front end wall 64 of the drop bucket 32. Three discrete chambers thus are formed within the drop bucket 32. During relatively small fills, most or all particles is a batch are dispensed into the downstream-most chamber. The benefits of this effect are discussed in more detail below.

Figure 6:
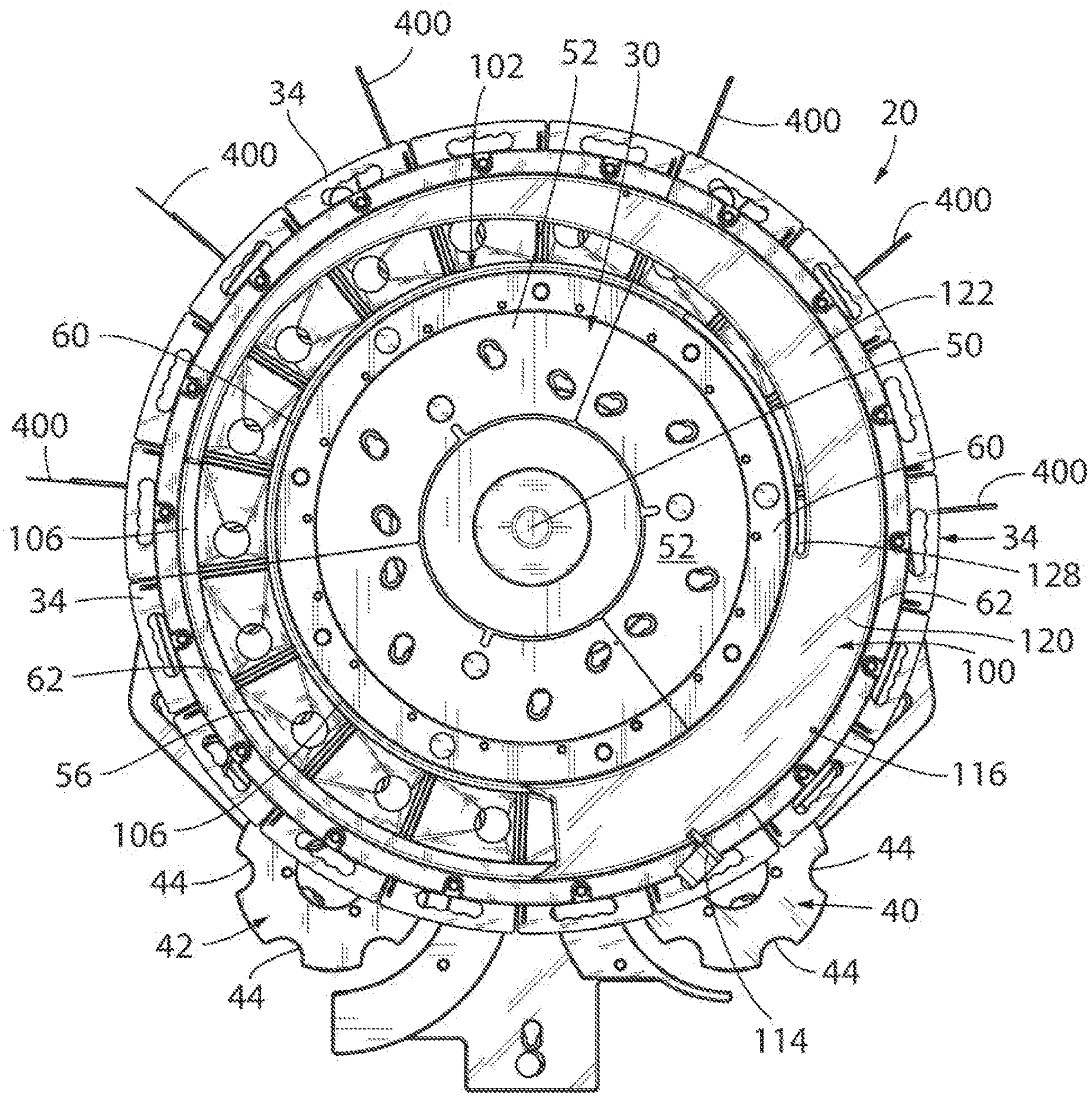
FIG. 6 is a top plan view of the rotary filling machine of FIGS. 1-3, showing the drop buckets removed.
Figure 7:
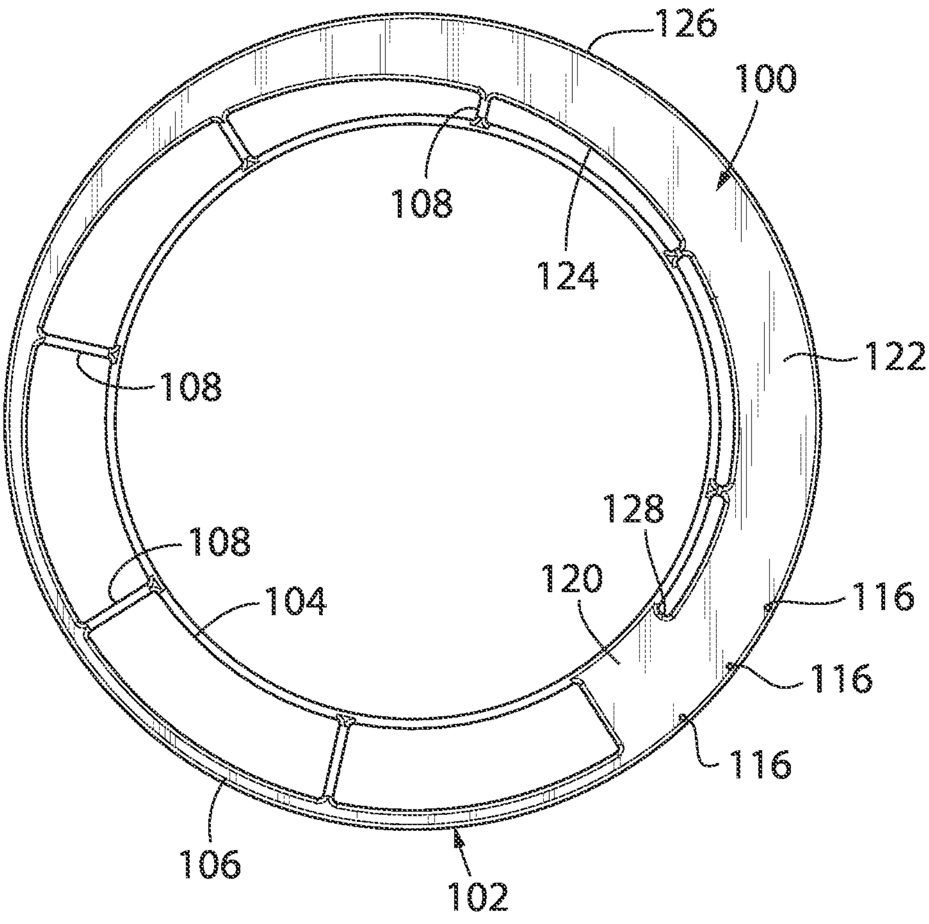
FIG. 7 is a top plan view of a slide plate of the rotary dispensing machine of FIGS. 1-3.

Referring to FIGS. 3-7, the slide plate or "drop plate" 100 is mounted in an upper recess between the inner and outer wear plate rings 60 and 62 so as to remain in place while the rings 60 and 62 rotate beneath it. The slide plate 100 may be formed of Delrin® or a similar material to facilitate this sliding contact while still providing the desired hardness and wear-resistance. It may, however, be formed of a separate material than that of the wear plate rings 60 and 62 to facilitate sliding movement of the two components relative to one another. For example, Delrin is particularly well-suited for the slide plate 100 if HDPE is used as the rings 60 and 62 of the wear plate. The slide plate 100 shown in FIG. 7 is formed integrally with an annular ring 102 that is segmented by a number of circumferentially spaced radial connecting arms 104. Inner and outer edges 106 and 108 of the ring 102 are supported on upwardly facing lips 110 and 112 formed on the outer peripheral surface of the inner wear plate ring 60 and the inner peripheral surface of the outer wear plate ring 62, respectively, as best seen in FIG. 5. The ring 102 prevents materials from accumulating on the lips 110 and 112 during a filling operation. The slide plate 100 is held stationary by a pin or similar device 114 (FIGS. 1, 3, and 6) that extends downwardly from a stationary mount into an opening formed in or through the slide plate 100. Accurate relative positioning of the slide plate 100 relative to the wear plate rings 60 and 62 can be provided by forming this opening in the form of a slot or by providing two or more spaced circular openings 116 as shown in FIG. 7.

Referring especially to FIG. 7, the slide plate 100 is configured such that a first portion of the slide plate overlies a portion of the upper inlet of a first of the upper funnel assemblies, and a second portion of the slide plate overlies the upper inlet of a second of the upper funnel assemblies that is downstream from the first funnel assembly. The slide plate is tapered or otherwise shaped such that that the funnel assembly area that is covered by the second portion is smaller than the funnel assembly area that is covered by the second area. The fill openings 56 and upper ends of the funnel assemblies are of equal size in this embodiment. Thus, in this embodiment, the slide plate 100 is configured so as to cause the effective sizes of the fill openings 56 encountered by materials in the rotating drop buckets 32 to increase progressively downstream of the rotary combination scale dispenser 22. In this embodiment, the radial diameter of the slide plate 100 is tapered over at least a portion of its length to act as a sliding trap door that causes the rotating drop buckets 32 to push particles into the fill openings 56 one at a time or in small groups rather than in a single clump. Hence, the upstream-most fill opening 56 encountered by a filled drop bucket 32 is nearly fully covered, and the downstream fill openings 56 that thereafter are encountered are progressively exposed until the fill openings 56 downstream of the slide plate 100 are entirely exposed.

More specifically, as best seen in FIGS. 5-7, when viewed in a direction of turret rotation, the slide plate 100 includes an upstream portion 120 of uninform diameter and a downstream portion 122 that tapers progressively in diameter toward the downstream end thereof. In the illustrated embodiment in which the slide plate extends through an arc of about 290 degrees, the tapered portion 122 extends through the downstream-most 170-250 degrees of the slide plate 100. This taper may be continuous and uniform along part or all the tapered portion 122. In the illustrated embodiment, the tapered portion has an arc length of about 235 degrees. The tapered inner edge 124 has a radius of about 17 degrees over about the upstream-most 60 degrees of the tapered portion and of about 18.5 degrees over the remaining 175 degrees.

A notch 128 is formed in the inner edge 124 of the upstream end of the tapered portion 122 so that the leading end of the taper is located over the associated fill opening 56 rather than being disposed inboard of the fill opening. In the illustrated embodiment in which the fill openings 56 are about 100 mm wide, the "effective width" of the fill openings 56, as defined by the portions of the fill openings 56 that are not covered by the slide plate 100, increase in diameter from about 12 mm at the upstream-most end of the tapered portion 122 to the full 100 mm at the downstream-most end of the slide plate 100, where the slide plate is no-wider than the lip 112 on the outer wear plate ring 62.

Still Referring to FIGS. 5-7, the upstream end portion 120 of the slide plate 100 completely covers the underlying fill opening(s) 56 to provide a gapless "receiving surface" for receiving dispensed batches of particle received from the rotary combination scale 22 and for staging them for subsequent dispensing into the fill openings as they become exposed. In the illustrated embodiment, the upstream portion has an arc-length of about 55-60 degrees. This arc length could be considerably longer, if desired.

It should be noted that the ring 102 of FIG. 7 is not essential for support or operation of the slide plate 100. The slide plate 100 or a similarly-constructed slide plate could be provided in the form of a crescent or half-moon shaped element lacking a ring. The slide plate 100 is illustrated without a ring in FIG. 6.

Figure 8:
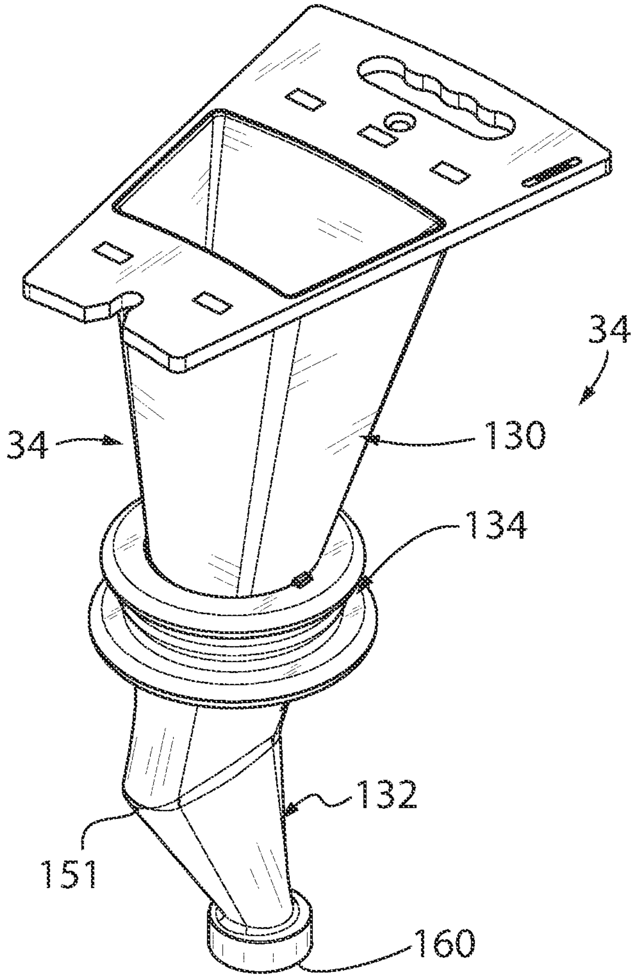
FIG. 8 is a perspective view of a funnel assembly of the rotary dispensing machine of FIGS. 1-3.
Figure 9:
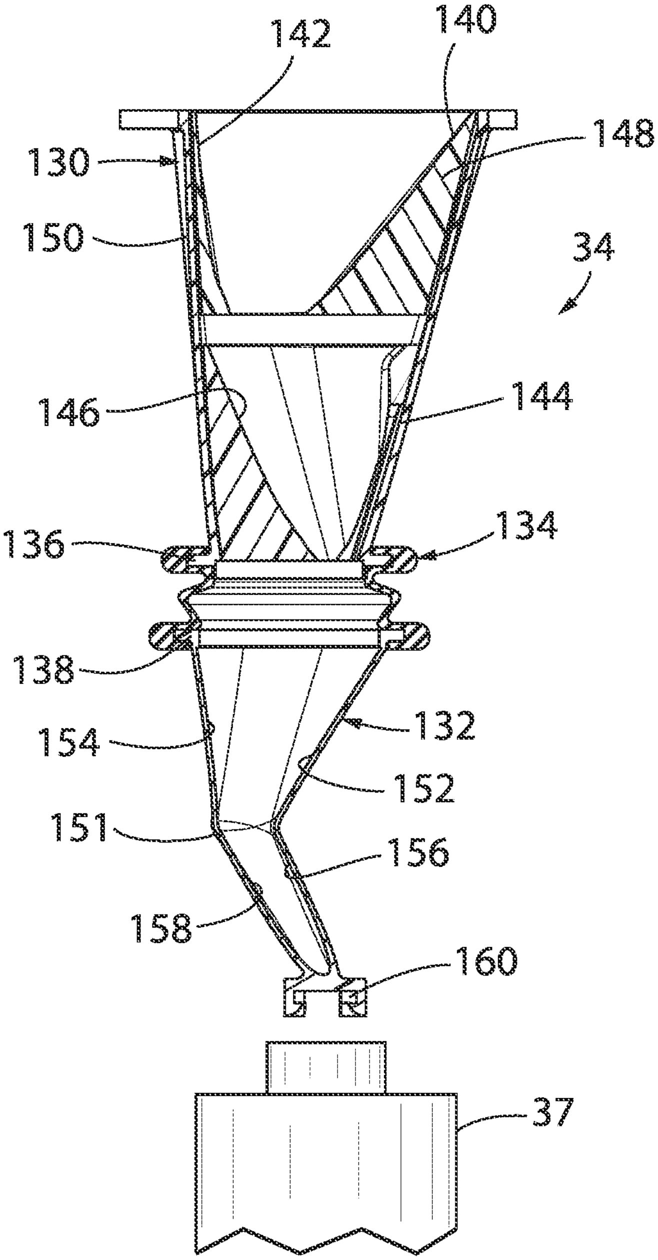
FIG. 9 is a sectional front elevation view of the funnel assembly of FIG. 8.
Figure 10:
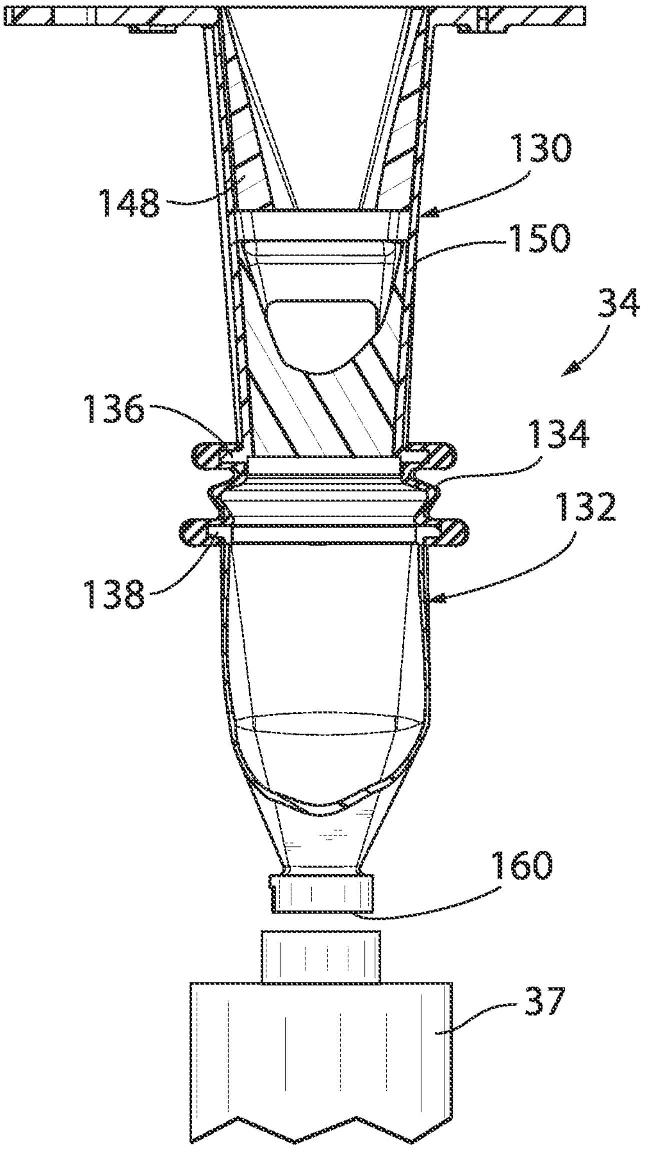
FIG. 10 is a sectional side elevation view of the funnel assembly of FIGS. 8 and 9.

Referring now to FIGS. 8-10, each funnel assembly 34 is configured to dispense materials falling through the associated fill opening 56 while further dilating those materials so that the materials are dispensed from a bottom dispensing outlet 160 of the funnel assembly 34 in or near a single file rather than in clumps. Outlet 160 typically has a diameter that is no greater than that of the inlet opening of the underlying container or, in the present non-limiting example, on the order of 20-40 mm and more typically of about 30 mm. The interior geometry of each funnel assembly 34 may be customized to accommodate the flow characteristics of the materials being dispensed. As a rule of thumb, the product flow path should be relatively simple for materials, like soft gummies, that are relatively sticky or tacky but that are not particularly prone to entanglement, and relatively complex for materials, such as cashews or hard gummies, that are not tacky or sticky but that are highly prone to entanglement or at least self-adhesion.

The funnel assemblies 34 shown in FIG. 8-10 are well-suited to dispense materials of the latter type. The illustrated funnel assembly 34 comprises upper and lower funnels 130 and 132 coupled to one another by a flexible bellows 134. The bellows 134 is retained in place by snap-fitting over a lower annular flange 136 on the upper funnel 130 and an upper annular flange 138 on the lower funnel 132. The upper funnel 130 may be universal to all dispensed materials or to broad classes of materials. The lower funnel 132 may be customized for a particular product, most notably including particle diameters, and thus may be thought of as a container adapter. The interior of each funnel assembly 34 may be of a non-linear and non-uniform volumetric taper so as to cause materials falling therethrough to zig-zag or bounce from side to side, breaking up clumps of entangled particles and further dilating or singulating the stream of flowing particles. A variety of geometries could achieve this effect, some more effectively for certain particles than others.

Referring specifically to FIG. 9, the interior of the upper funnel 130 defines an inner dilation camber bordered by an upper set of opposed first and second walls 140 and 142 and a lower set of first and second lower walls 144 and 146. Each set of walls may be provided on the interior surface of a removable insert 148 (or two or more stacked inserts) that is droppable into an outer shell 150 of the upper funnel 130 from above to permit customization for a particular application. The inserts 148, and the lower funnel 132, may be made from a durable wear resistant, low friction material such as urethane. The first wall 140 of the upper set is inclined downwardly and inwardly to a bottom edge located proximate the axial center of the upper funnel 130. At least most of the particles being swept into the funnel assembly 34 impinge on wall 140 and are defected to the opposed second wall 146 of the lower set. The second wall 146 of the lower set is inclined downwardly and inwardly to a bottom edge that directs particles to the inlet of the lower funnel 132. The second wall 142 of the upper set and the first wall 144 of the lower set act mainly as stops and see little or no product flow.

Still referring to FIG. 9, the bottom funnel 132 is kinked or "doglegged" at a central portion 151 thereof to define upper and lower portions that extend at an acute angle relative to one another. As with the upper funnel 130, the interior of the lower funnel 132 has first and second upper walls 152 and 154 and first and second lower walls 156 and 158. The first wall 152 of the upper set is inclined downwardly and inwardly to a bottom edge. The second wall 158 of the second set is inclined downwardly and inwardly to the bottom outlet 160 of the funnel assembly 34. Particles bouncing off the first wall 152 of the upper set impinge on the second wall 158 of the lower set, where they are further singulated as they flow toward the lower outlet 160. The second wall 142 of the upper set and the first wall 152 of the second set act mainly as stops and see little or no product flow.

Comparing FIG. 9 to FIG. 10, it can be seen that at a minimum the lower portion of the opening in the lower funnel 132 progressively narrows in one or "X" direction as shown in FIG. 9 and widens in the other or "Y" direction as shown in FIG. 10. This geometry helps prevent bridging of particles at the bottom outlet 160 by maintaining a relatively large flow area at the outlet despite presenting a taper in one direction for direction purposes.

Figure 12:
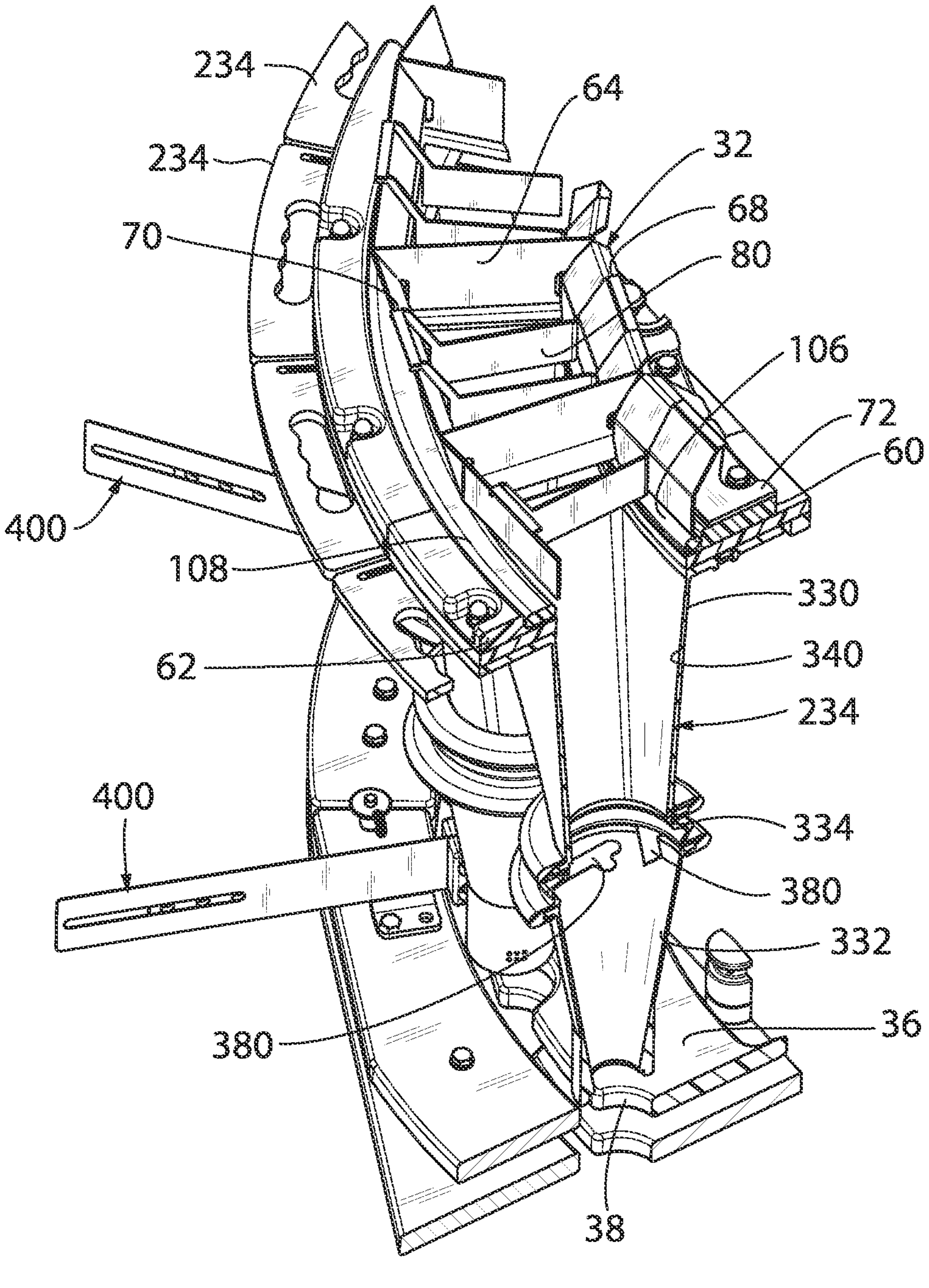
FIG. 12 is an isometric view of a funnel assembly constricted in accordance with another embodiment of the present invention.

Referring now to FIG. 12, a funnel assembly 234 may be fitted with inwardly-projecting fingers 380 that serve to be impacted by and break up any clumps that may survive the fall through the upper funnel 330. The funnel assembly 234 of this embodiment otherwise is similar to that of the first embodiment in that it has upper and lower funnels 330 and 332 coupled by a flexible bellows 334. The fingers 380 project inwardly into the baffle 334 from the outer perimeter thereof. Three such fingers (two of which are shown in FIG. 12) are provided in the illustrated embodiment, spaced equidistantly around the funnel assembly 234. Each finger has an inner, product engaging end that may have a tab thereon, and an outer end clamped between the upper surface of the bellows 334 and the lower surface of the mounting flange 336 of the upper funnel 330. The fingers 380 may be inclined relative to the horizontal at any desired angle to achieve the desired disrupting effect, and their angles of inclination may vary relative to one another. The fingers 380 may be formed, for example, of stainless steel or spring steel.

The material flow path in the funnel assembly 234 of FIG. 12 also is more direct or linear than in the funnel assembly 34 of FIGS. 8-10 in order to accommodate tackier or sticker materials that tend to adhere to any surface they contact. In this embodiment, both the upper and lower funnels 330 and 332 are at least primarily frustoconical in shape. Thus, the dogleg in the lower funnel 132 is eliminated. In addition, in the upper funnel 330, the first and second sets of walls of different relative inclinations are replaced by a single peripheral wall 340 of relatively uniform inclination.

Of course, the fingers 380 of FIG. 12, as well as other fingers or other elements protruding into the funnel assembly to help break up clumps, also could be provided in the funnel assembly of FIGS. 8-10.

Figure 11:
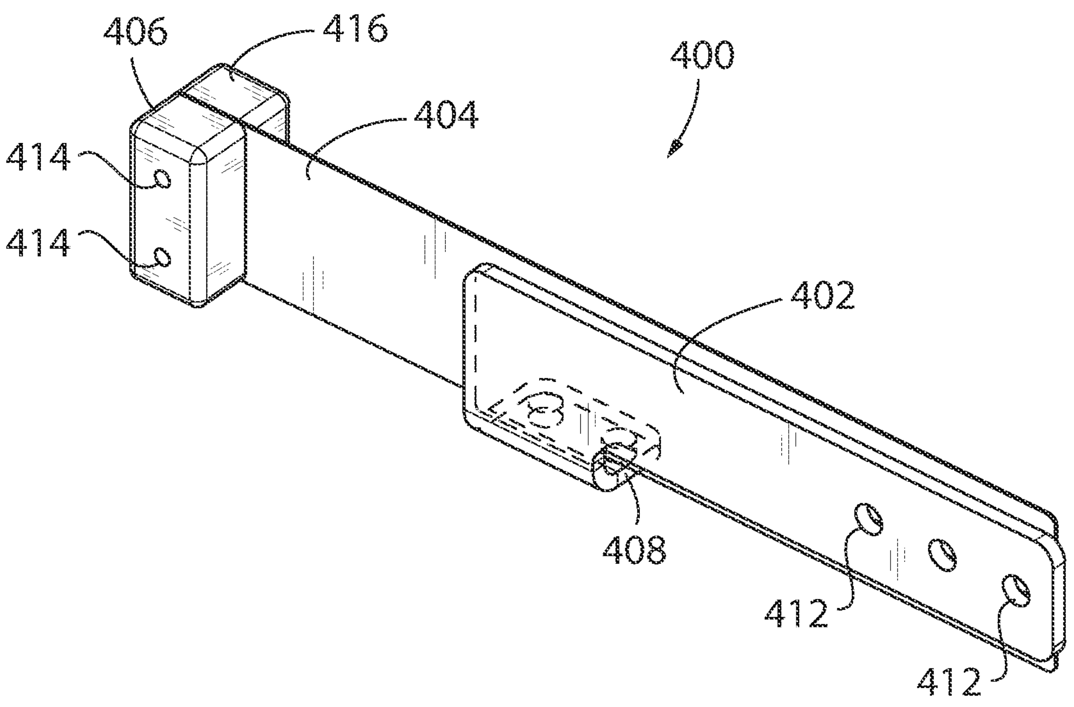
FIG. 11 is an isometric view of a funnel knocker assembly of the rotary filling machine of FIGS. 1-3.

Referring to FIGS. 3, 5, and 11, additional measures may be provided to impart shocks or vibrations to the funnel assemblies 34 to dislodge particles tending to bridge the funnels or stick to their inner wall. In the illustrated embodiment, these measures take the form of "funnel knockers" 400 that are impacted by the rotating funnel assemblies 34. Several such funnel knockers 400 could be spaced around the filling machine 20 in cooperation with some or all of the funnel assemblies that are actually dispensing product at any given time. Six such funnel knockers 400 are provided in this embodiment, spaced circumferentially around the filling machine 20 between the upstream end of the tapered portion 122 of the slide plate 100 where particles first fall into the underlying funnel assemblies 34 to a location disposed downstream of the downstream end of the slide plate 100.

Each funnel knocker 400 comprises a rigid mounting arm 402, a spring arm 404, and an impact block 406. Each mounting arm 402 has a base 408 bolted to a stationary support surface of the filling machine 20. Each spring arm 404 is relatively flexible and may, for instance, be formed of spring steel. Each spring arm 404 has a first end affixed to the mounting arm 402 and a second, free end, positioned in the path of funnel assembly rotation. The radial position of the spring arm 404 relative to the mounting arm 402 may be adjustable, for example, by providing a slot 410 in the spring arm 402 for mating with spaced holes 412 in the mounting arm 02. The impact block 406 is mounted on the free end of the spring arm 404 by bolts 414 that extend through the impact block 406, through the spring arm 404 and into a mounting block 416 located behind the spring arm 404. This mounting block 416 provides additional mass to the structure being deflected by the rotating funnel assemblies 34. The impact block 406 is formed from a durable, wear resistant material such as Delrin. In operation, engagement of the impact block 406 with the revolving funnel assemblies resiliently deflects the free end of the spring arm 404 out of the path of funnel assembly rotation while imparting a shock to the funnel assemblies 34.

In operation, the turret 30 of the rotary filling machine 20 is driven to rotate while particles of bridgeable materials are deposited into the drop buckets 32 from the rotary combination scale dispenser 22. The particles in each drop bucket 32 initially fall onto the slide plate 100, and are swept into the fill openings 56 one at a time or in small groups as the drop bucket 32 rotates over the progressively-narrowing tapered portion 122 of the slide plate 100, thus tending to singulate the particles or, viewed another way, dilate the particle stream into individual particles or small clumps of particles. If the dispensed batch is relatively small so as not to fill the bottom of the drop bucket 32, the partitions hinder the "snow-plowing of particles" along the edge of the opening adjacent the slide plate 100 rather than the sweeping of those particles into the fill opening 56.

If the funnel assembly 34 is of the serpentine type shown in FIGS. 1-10, materials fulling into the funnel assembly 34 will further singulate or dilate as they bounce back and forth from the upper funnel 130 and the lower funnel 132 before falling out of the discharge outlet 160 and into the container 37. The falling particles are further singulated or dilated during this process, resulting of the dispensing of materials into the underlying container 37 in a stream of mostly-single particles. Impacts of the funnel knockers 400 against the funnel assembles 34 during this process will inhibit or prevent the adhesion of particles to any particular surface of the funnel assembly with attendant decreased risk of bridging.

If, on the other hand, the funnel assembly 234 is of the more traditional orientation as shown in FIG. 12, the materials simply drop through the funnels 330 and 332 and out of the discharge opening. Any clumps of materials will impact one or more the fingers 380, tending to singulate the particles falling past the fingers. Such fingers also could be provided in the funnel assemblies 34.

Variations and modifications of the foregoing are within the scope of the present invention. Some such variations and modifications are discussed above. Others will become apparent from the appended claims. Many changes and modifications could be made to the invention without departing from the spirit thereof. The scope of these changes and modifications will become apparent from the appended claims.

We claim:

1. A rotary filling machine comprising:

a rotatable hub;

a plurality of circumferentially spaced drop buckets that are configured to rotate with the hub, each drop bucket including a body having an open top that is configured to receive dispensed materials during a portion of a rotational phase of the rotary filling machine, an open bottom that is configured to discharge materials, a perimeter wall including inner and outer walls and first and second end walls, and at least one partition that extends between the inner and outer walls and that is positioned between the first and second end walls to define discrete chambers within the drop bucket;

a plurality of funnel assemblies that are configured to rotate with the hub, each funnel assembly having an upper inlet that is positioned beneath the bottom opening of a corresponding drop bucket and that is configured receive discharged materials from the bottom of the associated drop bucket, and having a lower dispensing outlet; and a stationary slide plate located vertically between the funnel assemblies and the drop buckets, wherein, when viewed in a direction of turret rotation, the slide plate has an upstream end, a downstream end, upper and lower surfaces, and inner and outer edges, and wherein a radial diameter of the slide plate is tapered along at least a portion of a circumferential extent of the slide plate so that the slide plate is configured such that areas of flow paths from the bottoms of the drop buckets to the inlet openings of the funnel assemblies through the stationary slide plate increase progressively through the portion of the circumferential extent of the slide plate.

2. The rotary filling machine of claim 1, wherein the slide plate has a tapered inner edge portion configured to taper the radial diameter of the slide plate.

3. The rotary filling machine of claim 2, wherein the tapered inner edge portion of the slide plate is tapered continuously throughout at least a majority of the tapered inner edge portion.

4. The rotary filling machine of claim 3, wherein the tapered inner edge portion of the slide plate extends through an arc of at least 150 degrees.

5. The rotary filling machine of claim 2, wherein the slide plate has a tapered inner edge portion that extends over the first and second funnel assemblies.

6. The rotary filling machine of claim 1, wherein the slide plate is integrated into a segmented ring mounted on the hub.

7. The rotary filling machine of claim 1, wherein the opposed end walls of each drop bucket have a shorter extent than each of the inner and outer walls.

8. The rotary filling machine of claim 1, wherein each drop bucket has at least two laterally extending partitions that are spaced longitudinally from one another to define at least three distinct chambers.

9. The rotary filling machine of claim 8, wherein each partition of each of the drop buckets extends at least generally vertically.

10. The rotary filling machine of claim 9, wherein an upper end portion of each of the walls of each of the drop buckets is flared outwardly to collectively serve as a chute, and wherein the partition of each of the drop buckets has an upper end positioned beneath the upper end portions of the walls.

11. The rotary filling machine of claim 8, wherein each of the drop buckets is generally trapezoidal in shape, and wherein the outer wall is longer than the inner wall.

12. The rotary filling machine of claim 11, wherein the drop buckets are supported on the hub.

13. A rotary filling machine comprising:
- a rotatable hub;
- a plurality of circumferentially spaced drop buckets mounted on and rotatable with the hub, each drop bucket including a body having an open top that is configured to receive materials during a portion of a rotational phase of the rotary filling machine, an open bottom that is configured to discharge materials, and a perimeter wall including inner and outer walls and first and second end walls; and
- at least two spaced partitions, wherein
  - each partition extends at least generally vertically from a lower end thereof to an upper end thereof,
  - each partition extends generally laterally of the associated drop bucket and has an inner end positioned adjacent the inner end wall of the associated drop bucket and an outer end positioned adjacent the outer wall of the associated drop buckets, wherein the partitions are spaced longitudinally from one another to define at least three discrete chambers within the associated drop bucket, wherein
  - an upper end portion of each of the walls is flared outwardly to collectively serve as a chute, and wherein
  - each partition has an upper end positioned beneath the upper ends of the walls of the associated drop bucket;
- a plurality of funnel assemblies that are configured to rotate with the hub, each funnel assembly having an upper inlet that is positioned beneath the bottom opening of a corresponding drop bucket and that is configured to receive dispensed materials therefrom, and having a lower dispensing outlet; and
- a stationary slide plate that is located vertically between the funnel assemblies and the drop buckets, the slide plate being integrated into a segmented ring mounted on the hub, wherein,
- when viewed in a direction of turret rotation, the slide plate has an upstream end, a downstream end, upper and lower surfaces, and inner and outer edges, and wherein the slide plate includes a first portion and a second portions downstream of the first portion in the direction of turret rotation that overlie first and second funnel assemblies to define first and second areas of the respective funnel assembly inlets that remain uncovered by the slide plate, the second funnel assembly being located downstream of the first funnel assembly in the direction of turret rotation, and wherein
- the second area is larger than the first area.

14. A method of operating a rotary filling machine, comprising:
- dispensing material in an open top of a drop bucket from above, the drop bucket being one of a plurality of circumferentially-spaced drop buckets that are supported on a rotary hub so as to rotate with the hub;
- separating materials via interaction with a partition located within the drop bucket into at least first and second chambers in the drop bucket that are located on opposite sides of the partition;
- depositing materials from the drop bucket onto a stationary circumferentially-extending slide plate that is located beneath the drop bucket and that is integrated into a segmented ring mounted on the hub;
- sweeping materials from the drop bucket via movement of the drop bucket along the slide plate so that the materials fall off the slide plate in flow paths that increase progressively in area in the direction of turret rotation through at least a portion of a circumferential extent of the slide plate.

15. The method of claim 14, wherein, during the sweeping, materials fall off the slide plate one at a time or in small groups rather than in a single clump.

16. The method of claim 14, wherein materials falling off the slide plate fall into open tops of a plurality of circumferentially-spaced, open-topped funnels that are supported on the rotary hub so as to rotate with the hub.

17. The method of claim 16, wherein the sweeping comprises sweeping materials off a tapered edge of the slide plate that overlies a plurality of discharge openings located over the funnels, the discharge openings increasing progressively in area along a circumferential extent of the slide plate.

* * * * *